(12) United States Patent
Thompson et al.

(10) Patent No.: US 8,385,850 B1
(45) Date of Patent: Feb. 26, 2013

(54) TELECOMMUNICATIONS ENCLOSURE WITH PASSIVE COOLING

(75) Inventors: Scott D. Thompson, State College, PA (US); Mike Askey, State College, PA (US); Rick Coklin, Bellefonte, PA (US)

(73) Assignee: Oberon, Inc., State College, PA (US)

( * ) Notice: Subject to any disclaimer, the term of this patent is extended or adjusted under 35 U.S.C. 154(b) by 204 days.

(21) Appl. No.: 13/020,790

(22) Filed: Feb. 3, 2011

(51) Int. Cl.
*H04B 1/38* (2006.01)
(52) U.S. Cl. ...................... 455/90.3; 455/351
(58) Field of Classification Search ............ 455/73, 455/550.1, 90.2, 90.3, 347, 351, 352, 899; 361/600, 688, 724, 727, 814; 439/367
See application file for complete search history.

(56) References Cited

U.S. PATENT DOCUMENTS

| | | | |
|---|---|---|---|
| 2009/0311969 A1* | 12/2009 | Wayman et al. | 455/73 |
| 2009/0311974 A1* | 12/2009 | Nelson et al. | 455/90.2 |
| 2012/0025683 A1* | 2/2012 | Mattlin et al. | 439/367 |

* cited by examiner

*Primary Examiner* — Thanh Le
(74) *Attorney, Agent, or Firm* — John J. Elnitski, Jr.

(57) ABSTRACT

A telecommunications enclosure for telecommunications equipment that includes an equipment housing with sealed openings to receive wiring. Each sealed opening having a removable blank so that the sealed opening can be utilized. There being at least two brackets mounted to the inside surface of the top of the equipment housing to receive and secure the telecommunications equipment. There being an enclosure door attached to the equipment housing to close off the open end of the equipment housing. The enclosure door being removable to allow access to the equipment housing. The enclosure door having perforations covering at least 30 percent of the enclosure door to allow airflow to flow in and out of the enclosure door when in a closed position on the equipment housing. The enclosure door having a depth such that a portion of the enclosure door with all of the perforations extends in the room.

20 Claims, 10 Drawing Sheets

TELECOMMUNICATIONS ENCLOSURE WITH PASSIVE COOLING

BACKGROUND

The present invention generally relates to telecommunications enclosures for data communications equipment. More specifically, the present invention relates to enclosures to house data communications network equipment in a suspended ceiling system using passive cooling.

Data networking equipment is used within offices to provide connectivity between computers within a private network on the premise and to provide connectivity to external networks via public connections such as the Internet or other types of public interconnects. Typically, the public network connection is cabled or feed wirelessly to an equipment room in the private building and is connected to the private in-building network using appropriate telecommunications equipment. The point of transition from the public network to the private network in the equipment room is called the demarcation point. Within the private building, on the private side of the demarcation point, the network is called a premises network, and is comprised of core, distribution, and access routers and switches which appropriately route or switch data packets throughout the premises network, or connect data packets to the public network by way of the demarcation point.

Within the private building, premises networking equipment installed on the private side of the demarcation point may also be installed within telecommunications rooms, which are commonly located on each floor or level of the building. From the telecommunications rooms, data cabling is distributed throughout the floor of the building to work areas that house PCs and other networked devices. The data networking equipment is generally standardized as to its width and height, so that the networking equipment can be mounted in standardized racks using standardized mounting features designed for the networking equipment. The standardized mounting width is about 19.75" and standardized height is about 1.75". The standardized height is often referred to as a rack mount unit. The telecommunications room is generally a secured ventilated room that physically and environmentally protects the equipment installed within the telecommunications room.

In most cases, the cabling from the telecommunications room is run horizontally across the level of the building to work areas located on the same level as the telecommunications room. These cabling runs are called horizontal cable runs. The horizontal cable runs may connect directly to PCs in the work area or to other networking equipment within telecommunications enclosures. The purpose of the telecommunications enclosures is to provide secure restricted access to networking equipment. The telecommunications enclosures may also provide cooling and environmental protection to the networking equipment. Unlike the telecommunications room, the telecommunications enclosure is mounted within the workspace area. The workspace area is where the networked end devices, such as PCs, laptops, printers, projectors, monitors, etc. reside. The workspace area can be a classroom, meeting room, office cubicle area, laboratory, etc. This hierarchy of building a data network through the equipment room, the telecommunications room, and the telecommunications enclosure is called structured cabling, which is used to provide optimal data throughput in the private building.

The telecommunications enclosure is commonly a floor or wall mounted metal cabinet which contains standardized rack mount features for standardized rack mountable networking equipment. The drawback with a floor or wall mounted telecommunications enclosure is that it occupies commonly precious space within the private building workspace. Another form of the telecommunications enclosure is a metal cabinet which is installed in a raised floor, as is often the case in computer rooms and other highly networked facilities. Another location to mount the telecommunications enclosure is within the air handling space above a suspended ceiling or directly on the suspended ceiling system. Horizontal cabling can be easily run in the air handling space using suitable plenum rated cabling above the suspended ceiling and connected to the telecommunications enclosure. Mounting the telecommunications enclosure in the ceiling conserves precious work space. However, there may be building construction, fire and electrical code problems related to a ceiling installation of the telecommunications enclosure. For the equipment to be mounted above the suspended ceiling system, precautions must be taken to avoid the spread of flame and smoke. This requires the equipment to be "plenum rated" or installed within a suitable non-flammable enclosure, which may not be ventilated. Access to the equipment above the drop ceiling may need to be restricted to avoid the spread of dust and contamination. In some environments, especially hospitals, it is desirable to not lift ceiling tiles in a suspended ceiling tile system, in order to mitigate the spread of dirt and infections. Suspended ceiling systems are designed to provide a certain degree of protection against the spread of fire and in some cases, smoke. If the telecommunications enclosure is to be constructed as part of the ceiling system, the telecommunications enclosure must be designed in such a way as to not degrade the fire protection afforded by the suspended ceiling system. Finally, there is commonly very little room above the suspended ceiling tile due to the presence of ductwork, piping, wire-trays, joists, and other structural components. The ceiling mounted telecommunications enclosure often has very little "depth" with which to contain networking equipment.

Existing telecommunications enclosures designed to mount in the ceiling system are generally closed, locking metal cabinets. They support the enclosed equipment above the ceiling tile within the air handling space. Because the cabinet is closed, ventilation to cool the active networking equipment is required. Fans and vent holes may not be permitted within the air handling space above the suspended ceiling, as they essentially introduce the equipment into the air handling space. Also, existing cabinets are quite deep in order to store the networking equipment entirely above the suspended ceiling. This may create a problem when installing the cabinet, when air-handling space above the ceiling system is restricted in depth.

It is an object of the present invention to provide a ceiling mounted telecommunications enclosure to be installed into a standard suspended ceiling system.

It is an object of the present invention to provide a telecommunications enclosure with passive cooling from areas other than air handling space above a suspended ceiling system.

SUMMARY OF THE INVENTION

A telecommunications enclosure for telecommunications equipment that includes an equipment housing with sealed openings to receive wiring. Each sealed opening having a removable blank so that the sealed opening can be utilized. There being at least two brackets mounted to the inside surface of the top of the equipment housing to receive and secure the telecommunications equipment. There being an enclosure door attached to the equipment housing to close off the open end of the equipment housing. The enclosure door is removable to allow access to the equipment housing. The enclosure door has perforations covering at least 30 percent of the enclosure door to allow airflow to flow in and out of the enclosure door when in a closed position on the equipment housing. The enclosure door has a depth such that a portion of the enclosure door with all of the perforations extends in the room.

DETAILED DESCRIPTION

Figure 1:
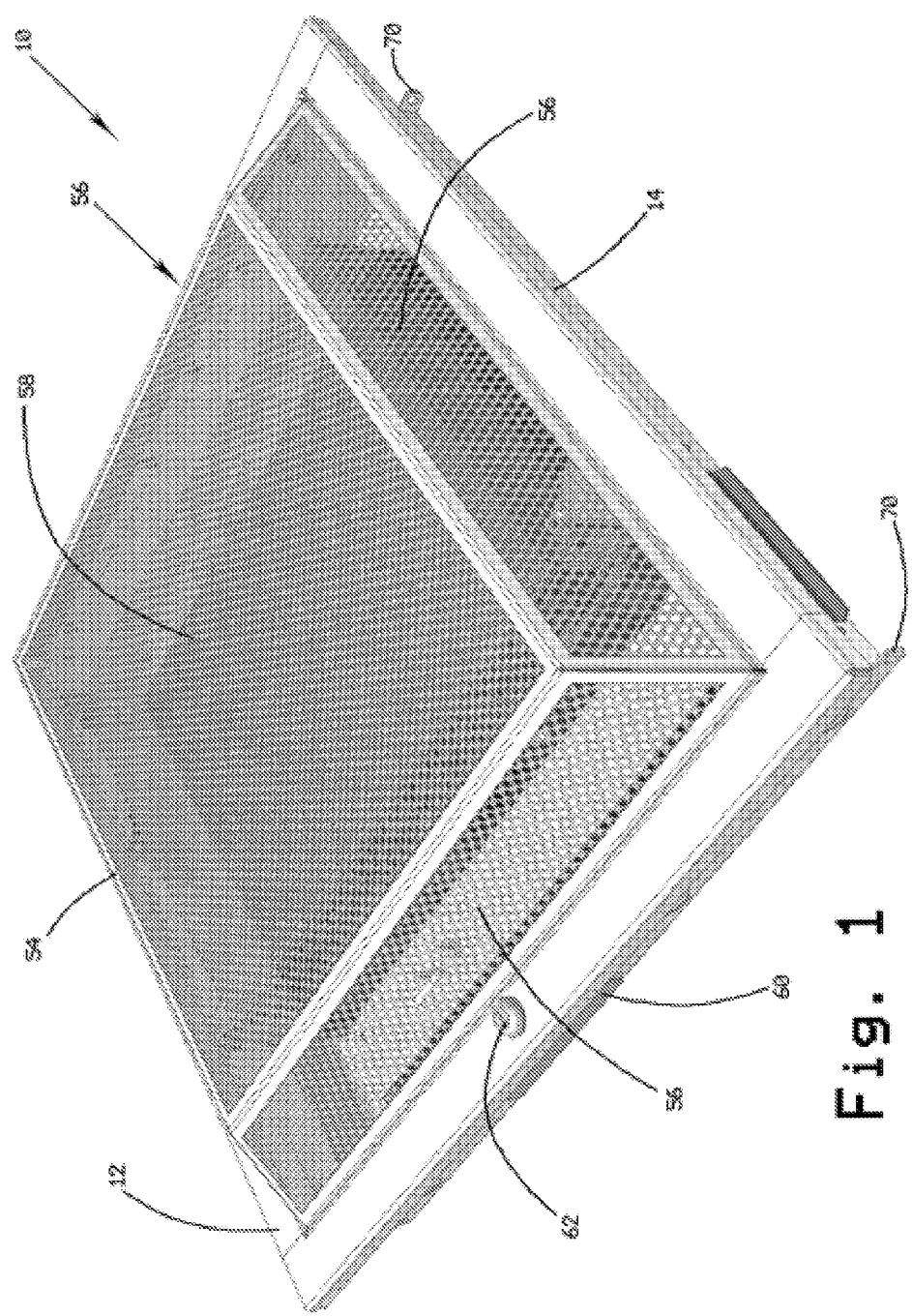
FIG. 1 is a perspective view of the telecommunications enclosure according to the present invention.
Figure 2:
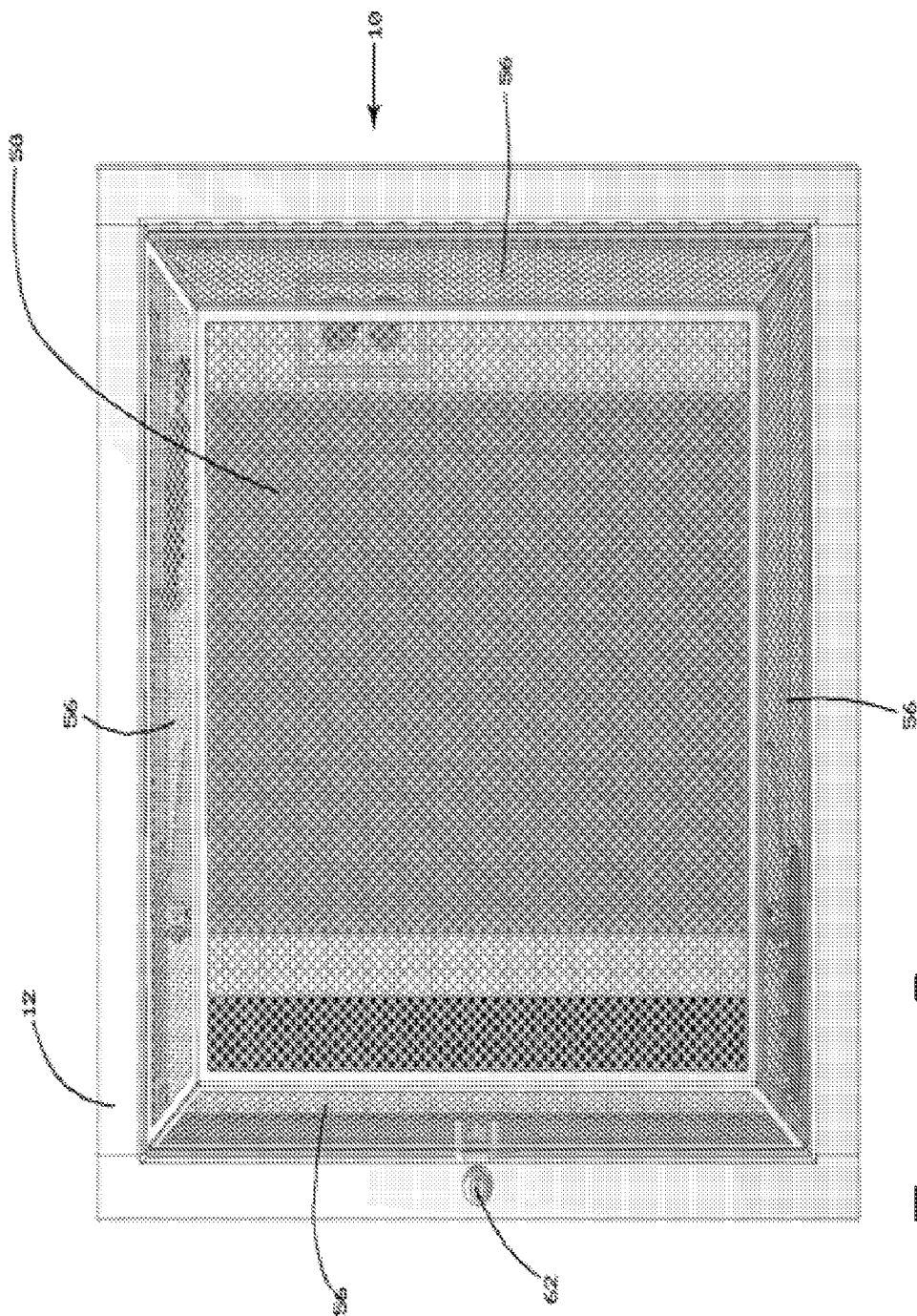
FIG. 2 is a bottom view of the telecommunications enclosure according to the present invention.

The present invention is telecommunications enclosure 10, as shown in FIG. 1. The telecommunications enclosure 10 employs passive cooling and includes features that allow the telecommunications enclosure to drop into the grid work of a standard suspended ceiling system. The telecommunications enclosure is designed to fit into the grid work of a standard suspended, false, drop, or acoustical ceiling. FIG. 2 shows a flange 12 as part of the telecommunications enclosure 10 to permit the telecommunications enclosure 10 to drop into the ceiling grid work and be supported by the ceiling grid work. The telecommunications enclosure 10 can be designed to be any size or shape. FIG. 2 shows the telecommunications enclosure 10 sized for a typical 2 foot by 2 foot ceiling system typically used in the United States. But, the telecommunications enclosure 10 could be 2'×4', 4'×4', metric, or any other form factor. The telecommunications enclosure 10 includes features to house standard rack mountable network equipment, such as Ethernet switches, routers, controllers, appliances, and UPSs. The telecommunications enclosure 10 uses standard compliant rack mounting features and dimensions.

FIGS. 1 and 3-9 shows that the telecommunications enclosure 10 includes a shallow equipment housing 14. The equipment housing 14 fits within the air-handling space above ceiling tiles of the suspended ceiling system. The equipment housing 14 is devoid of openings and does not contain ventilation holes. Minimizing openings in the equipment housing 14 preserves the integrity of the non-flammable fire barrier created by the suspended ceiling. The equipment housing 14 is typically made of solid sheet metal and includes covered openings. The covered openings are covered with blanking panels which can be removed to use plenum rated cable termination assemblies. The blanking panels are used to cover openings that are not used, but are there to be removed if needed. The plenum rated cable termination wiring assemblies allow the connection of cabling to the equipment housing 14 to preserve the fire rated integrity of the ceiling system.

Figure 3:
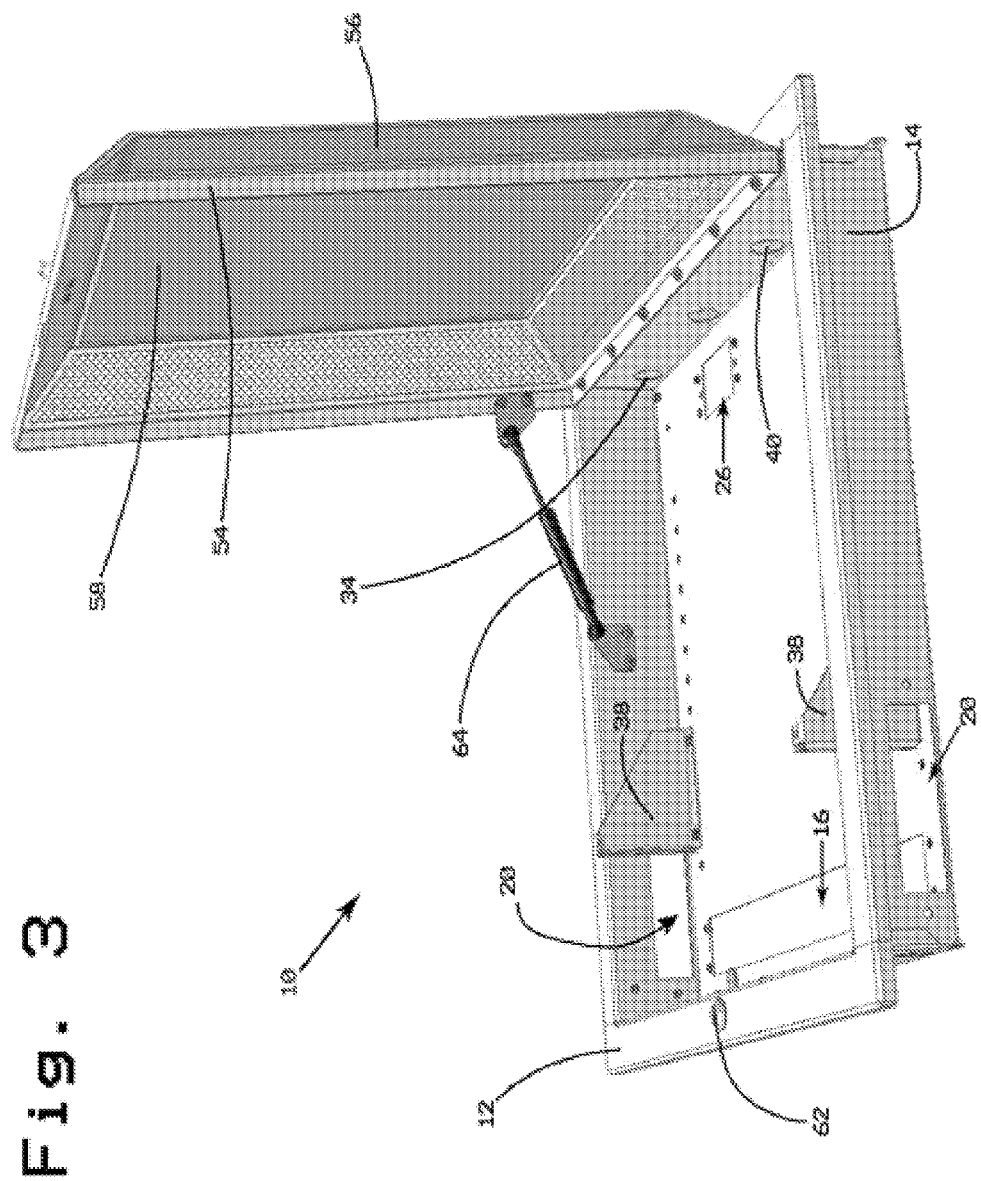
FIG. 3 is a perspective view of the telecommunications enclosure according to the present invention.
Figure 4:
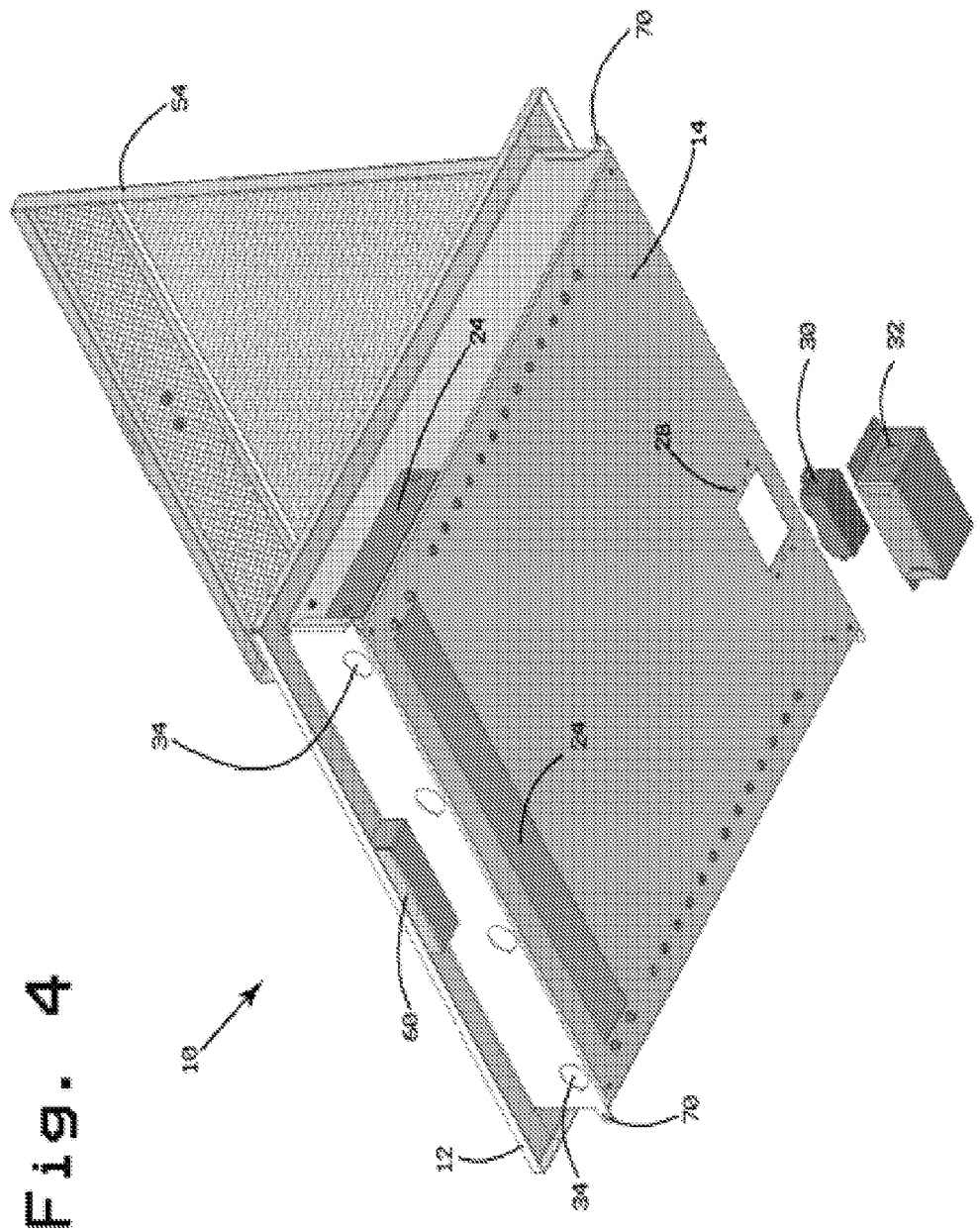
FIG. 4 is a perspective view of the telecommunications enclosure according to the present invention.

The telecommunications enclosure 10 permits installation of components and equipment within, as shown in FIGS. 1 and 5-7. The equipment housing 14 of the telecommunications enclosure 10 acts as a bulk-head to which horizontal communications cabling can be connected to equipment in the equipment housing 14. The horizontal communications cabling includes copper and fiber optic cables which can be terminated in the air handling space above the ceiling on the exterior side of the equipment housing 14. The communications cabling is terminated on exterior side of the equipment housing 14 using an appropriate cable termination assembly, sometimes know as a patch panel. For copper cable termination, an opening 16 for standard rack mountable patch panel 18 is provided. For fiber optic termination, an opening 20 for a standard fiber optic adaptor patch panel 22 is provided. Both or either of these openings 16, 20 are filled with the appropriate patch panel or filled with a blanking panel 24 to permit the user to incorporate the panel or panels of their choice. FIGS. 3 and 4 show the equipment housing 14 includes AC opening 26 and mounting holes 28 to receive an electrical duplex receptacle 30 for AC electrical power and junction box 32 to receive power cabling to the receptacle 30, as shown in 4. Knockouts 34 in the equipment housing 14 can be used to attach conduit clamps for situations where cabling is brought into the equipment housing 14 by way of conduit. Therefore, the provided openings 16, 20, 26 in the equipment housing 14 are either filled with the appropriate cable termination assembly or filled with a blanking panel 24 by the user to preserve the integrity of the equipment housing 14.

Figure 5:
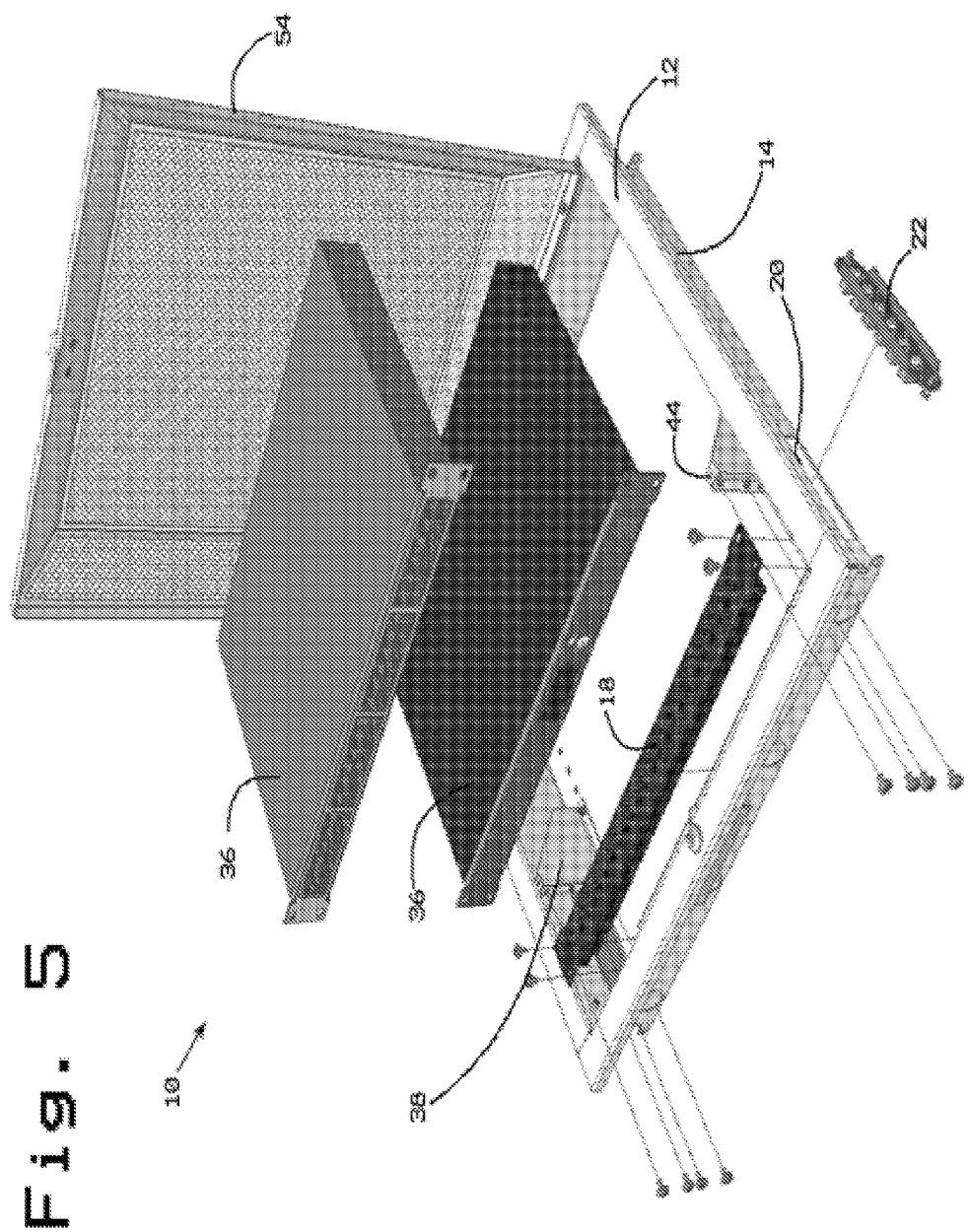
FIG. 5 is an exploded perspective view of the telecommunications enclosure according to the present invention.
Figure 6:
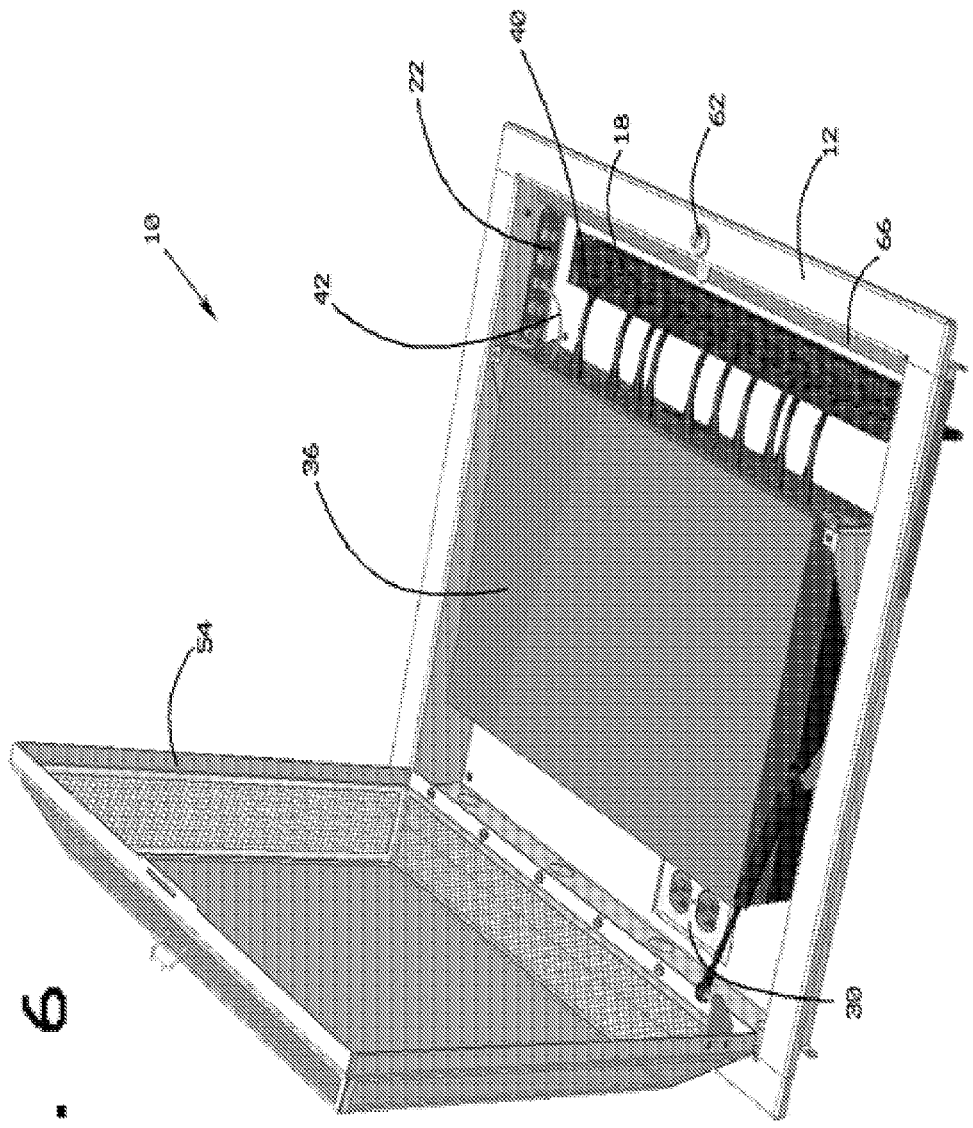
FIG. 6 is a perspective view of the telecommunications enclosure according to the present invention.

FIGS. 5-6 show the install of the standard rack mountable patch panel 18, the standard fiber optic adaptor panel 22 and multiple pieces of rack mountable equipment 36 attached to the equipment mounting brackets 38. The equipment mounting brackets 38 shown in FIG. 3 include the option to be mounted to the equipment housing 14 in various locations to match with the rack mountable equipment 36. The mounting of the equipment mounting brackets 38 can incorporate numerous adjustable features that permit the equipment mounting brackets 38 to be positioned forward and backward within the equipment housing 14. Examples of the adjustable features can be as simple as several mounting holes to receive screws to being as complicated as rails with slots to receive tabs from the equipment mounting brackets 38. When the equipment 36 is installed into the equipment housing 14, as shown in FIG. 6, copper cables 40 can be interconnected from the patch panel 18 to the equipment 36 and fiber cables 42 can be connected from the fiber adaptor panel 22 to the equipment 36. The equipment 36 can be plugged into the electrical receptacle 30.

Figure 7:
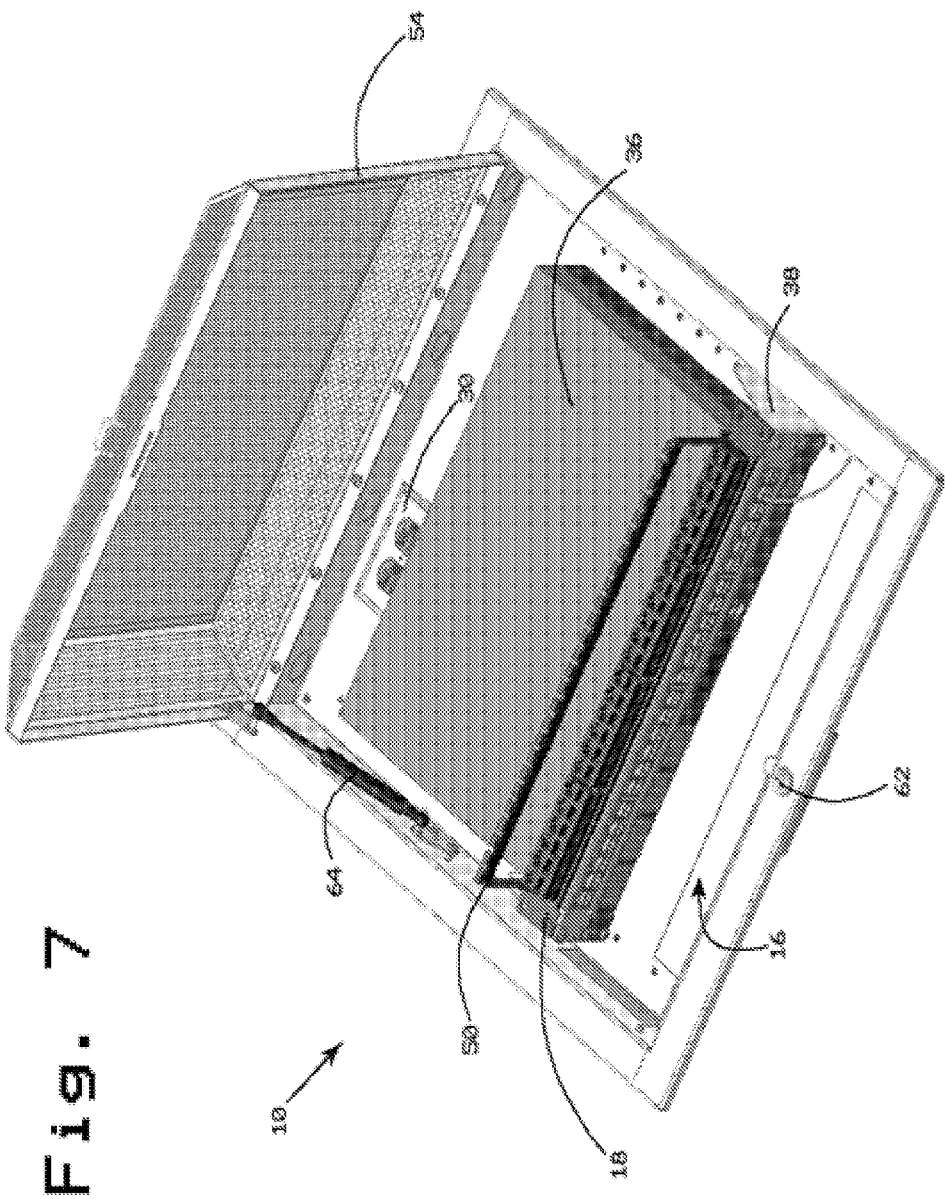
FIG. 7 is a perspective view of the telecommunications enclosure according to the present invention.
Figure 8:
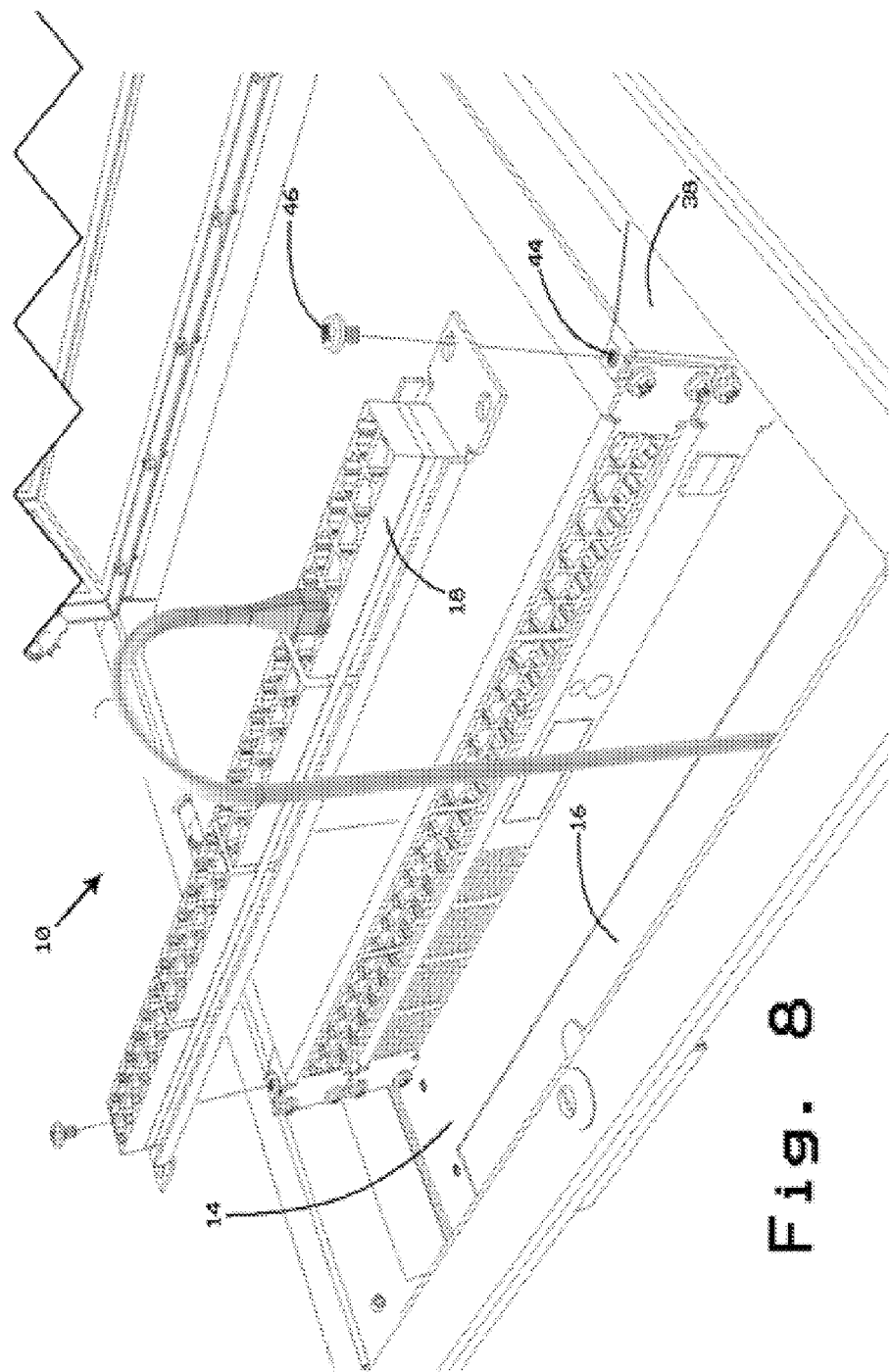
FIG. 8 is a perspective view of the telecommunications enclosure according to the present invention.

As shown in FIG. 7, the equipment mounting brackets 38 include the capability of inverse mounting the patch panel 18, by receiving and securing a patch panel 18 on the top of the equipment mounting brackets 38. FIG. 8 shows a tab on the equipment mounting brackets 38 that includes a threaded hole 44. Screws 46 are shown in FIG. 8 that are used to mount the patch panel 18 to the top of the equipment mounting brackets 38 using the holes 48 of the patch panel 18 and the threaded holes 44 of the equipment mounting brackets 38. This allows the patch panel 18 to be screwed in place to the top of the equipment mounting brackets 38. The patch panel inverse mounting feature permits the user to temporarily remove the patch panel 18 from the patch panel opening 16. The user can then invert the patch panel 18 and attach the patch panel 18 to the equipment mounting brackets 38. Commonly, the cables are attached to the patch panel 18 by "punching" the cable into a receptacle in the patch panel 18, using a punch down tool. This procedure, called "punching down" firmly fastens the cable to the patch panel receptacles. Punch down requires that the patch panel receptacles be clearly visible to the user and that the patch panel 18 is firmly attached to something so that that cables can be properly punched in to the receptacles. With the patch panel 18 in this secured inverted position as shown in FIGS. 7-8, the user can easily attach cables to the patch panel 18, as compared to when the patch panel 18 is mounted in the normal position in the equipment housing 14 and pointing into the ceiling space. By inversely mounting the patch panel 18 onto the inverse mounting features of the equipment mounting brackets 38, the patch panel receptacles are more clearly visible to the user, and the cables can be successfully punched down into the patch panel 18, or otherwise serviced by the user. After the patch panel 18 is service, the patch panel 18 can then be detached from the inverse mounting feature of the equipment mounting brackets 38 and the attached cables pushed through the opening 16. Then the patch panel 18 can be reattached to the equipment housing 14 in normal position of the patch panel 18.

Figure 9:
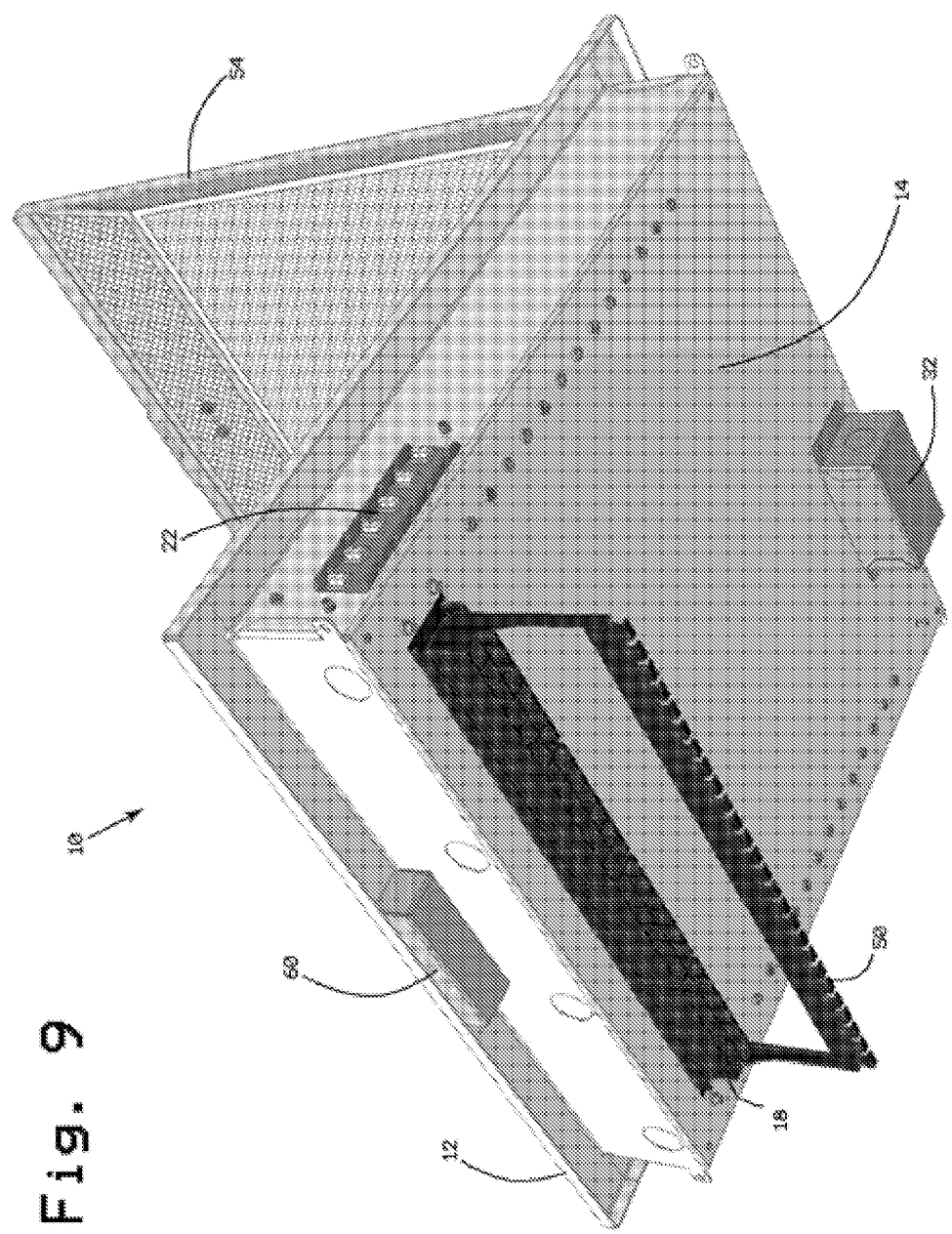
FIG. 9 is a perspective view of the telecommunications enclosure according to the present invention.

Cable management features 50 can be mounted to the equipment housing 14, as shown in FIG. 9, to provide stress relief to cables which reside in the air handling space and are terminated on the patch panel 18. As described earlier, cables are "punched down" into receptacles in the patch panel 18, then the cables are fed through the patch panel opening 16 in the back of the equipment housing 14, and the patch panel 18 is attached to the equipment housing 14 over the opening 16. The cables now exit the back of the equipment housing 18. In order to avoid damage to the cables by stressing, crushing or bending, the cables can be fastened to or looped around a cable management feature 50. The cable management feature 50 is a bar or bracket designed to fasten to the back of the patch panel 18 or equipment housing 14. The cable management feature 50 is positioned such that cables connected to the back of the patch panel 18 can be fastened to or looped around the cable management feature 50, thereby helping to avoid damage to the cable connector or cable itself. This cable management feature 50 may also apply to wherever cables or wires terminate into the equipment housing 14. The patch panels 18 and connector panels 22 affixed to the equipment housing 14 create a sealed barrier between the air-handling space above the ceiling and the work area below the ceiling to preserve the integrity of the suspended ceiling system. This is important for separating the environmental airflow of the workspace environment and the plenum space above the drop ceiling. It may is also important for maintaining the burn rating of the ceiling system.

It is desirable to cool the enclosed equipment passively. Fans within the telecommunications enclosure 10 or side walls of the telecommunications enclosure 10 may make undesirable amounts of noise. Fans can be unreliable, as they can fail when covered with dust and therefore require maintenance. An enclosure door 54 is mounted to the equipment housing 14 to form the telecommunications enclosure 10 in order to provide a cooling solution and added space solution. The enclosure door 54 extends into the workspace and is highly perforated to permit air mixing within the telecommunications enclosure 10. The enclosure door 54 is shown with perforated angled sidewalls 56 and a perforated face 58.

The equipment 36 is accessed within the telecommunications enclosure 10 by opening the enclosure door 54. Use of the enclosure door 54 removes the necessity to access the equipment 36 from the air handling space side of the ceiling, thereby mitigating dust and infection spread in clean environments. The enclosure door 54 being perforated allows for passage of air to mix through and around the equipment 36 mounted in the equipment housing 14 without the use of fans. The enclosure door 54 is typically perforated in the range of 30 to 50 percent, meaning the perforations comprise 30 to 50 percent of the surface area of the enclosure door 54. The angled sidewalls 56 reduce the weight of the enclosure door 54, while providing strength and stiffness to such a large perforated area. The angled sidewalls 56 can reduce the force of impacts and improves air-mixing by providing a pass thru for air to flow from one side of the enclosure door 54 to the other side. The perforations are preferred over louvers and ventilation slots as the highly perforated door will permit better passive air mixing than the louvers would. Although circular perforations are shown, perforation of other shapes could be used. The perforations also permit some visibility to the equipment 36 contained within. The enclosed equipment 36 is cooled by passive air mixing though the highly perforated enclosure door 54 as it extends into the workspace. The enclosed equipment 36 generally has an internal fan, which moves air in and out of the equipment. The air is generally moved in one side of the equipment 36 and then out a side opposite the side that the air entered.

The perforated enclosure door 54 aids to prevent overheating of the enclosed equipment 36. Extending the enclosure door 54 into the workspace allows the size of the equipment housing 14 that extends into the air-handling space to be minimized, as a portion of the equipment 36 also extends into the area of the enclosure door 54. This provides more depth to the telecommunications enclosure 10. The equipment mounting brackets 38 positions the equipment 36 substantially within the depth of the enclosure door 54. As much as one-half of the depth of the telecommunications enclosure 10 is provided by the enclosure door 54, the other half is in the equipment housing 14. This helps to minimize the penetration of the telecommunications enclosure 10 into the plenum space. Air circulation is created by the internal fan of the equipment 36 that draws in air from one side of the enclosure door 54 and exhausts the air out another side of the enclosure door 54. Thus, the equipment's internal cooling fan is able provide the air circulation within the telecommunications enclosure 10. All of the air circulation is comprised of air drawn from the workspace and not air from the air handling space above the suspended ceiling.

In FIG. 1, the enclosure door 54 is shown to be hinged and locked to allow restricted, but convenient, access to the enclosed telecommunications equipment 36 from the workspace. In FIG. 4, a lock mechanism cover 60 is designed to prevent tampering with lock 62 from the exterior. Because the enclosure door 54 may be faceted with angled sidewalls 56 as shown, it is desirable to have the lock 62 on the flange 12 of the equipment housing 14. With the lock 62 in the flange 12, it is possible to tamper with the lock 62 unless the lock 62 is protected by a lock mechanism cover 60. This lock mechanism cover 60 is designed to be permanently affixed to the flange 12 to mitigate tampering with the lock 62. In FIG. 7, a gas spring 64 is used to assist and control the opening of the enclosure door 54 and prevents the enclosure door 54 from swinging open when unlocked. When mounted in the ceiling, an unlocked enclosure door 54 will naturally swing open due to gravity. The gas spring 64 controls and slows the opening of the enclosure door 54. When the enclosure door 54 is initially unlocked, the gas spring 64 keeps the enclosure door 54 shut and provides resistance to the enclosure door 54 opening such that the user must manually apply force to open the enclosure door 54. Once the enclosure door 54 has been opened beyond 45°, the gas spring 64 provides less resistance and permits the enclosure door 54 to open to the 90° position. The gas spring 64 then holds the door open at a 90° angle from the equipment housing 14. When the user wants to close the enclosure door 54, the gas spring 64 provides some resistance, but when the enclosure door 54 is nearly shut, the gas spring 64 will draw the enclosure door 54 closed. The gas spring 64 could be replaced by other opening resistance mechanisms, such as a door stay torsion hinge.

FIG. 6 shows an interior light strip 66 installed in the telecommunications enclosure 10. The light strip 66 permits easier maintenance of installed equipment and cabling. The strip light 66 may be powered by the internal AC power or an additional source. The light strip 66 may be an incandescent or solid state lighting which provides enough light for the user to effectively work within the telecommunications enclosure 10. The light strip 66 may be turned on by the user with a user activated switch or may turn on automatically when the enclosure door 54 is opened using a door activated switch.

Figure 10:
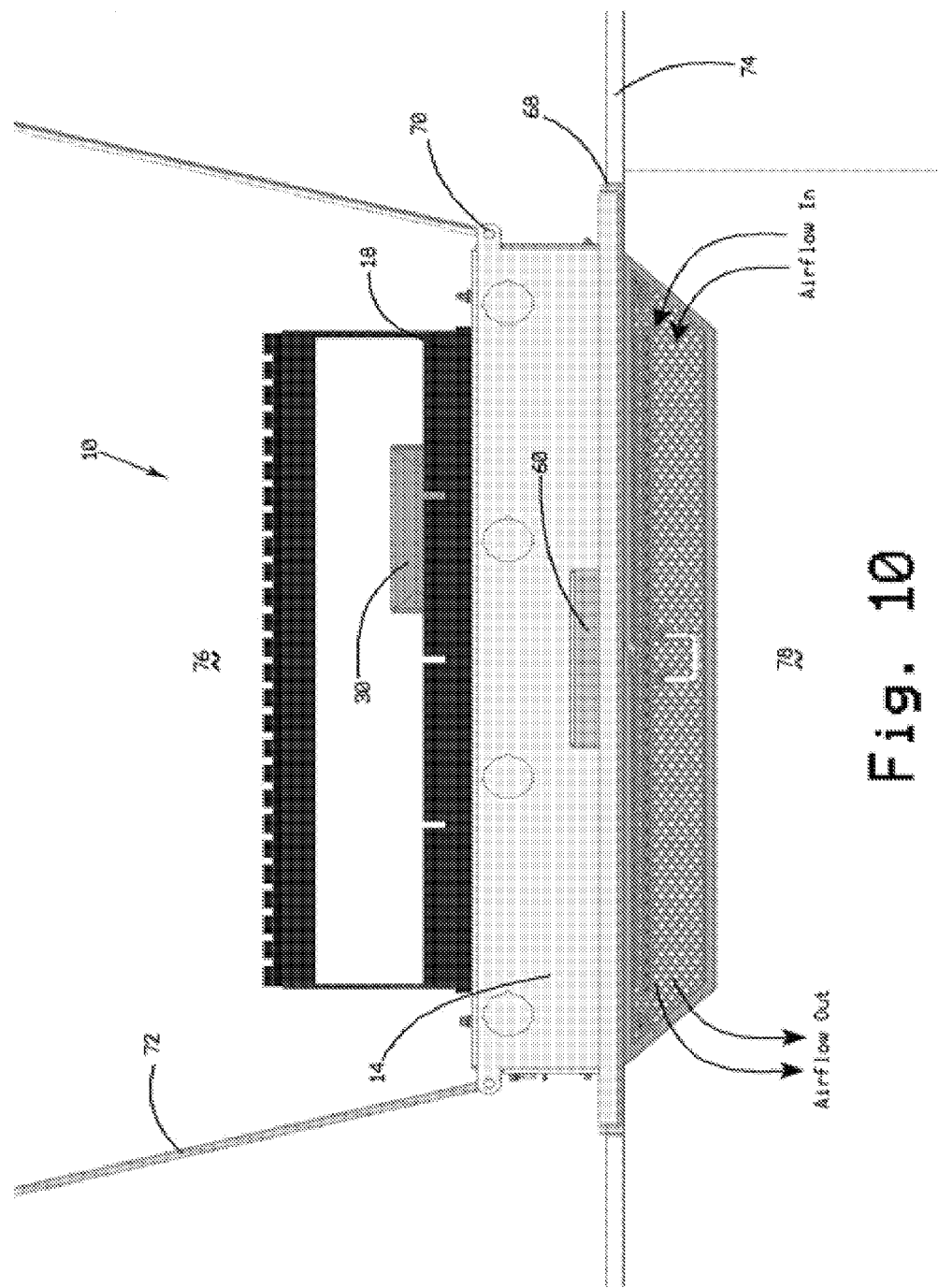
FIG. 10 is a side view of the telecommunications enclosure according to the present invention.

The telecommunications enclosure 10 is mounted within the ceiling grid work 68, as shown in FIG. 10. The telecommunications enclosure 10 should be supported by support wires or rods attached to the equipment housing 14 and should not be dependent on the ceiling tile grid work to support the entire weight of telecommunications enclosure 10. FIGS. 4-6 and 9-10 show grid wire tabs 70 used to support the equipment housing 14 from the structural support system of the building. This so that the entire weight of the telecommunications enclosure 10 is not on the ceiling tile grid work. Supporting grid wires 72 are attached to the grid wire tabs 70 to provide additional support.

When the telecommunications enclosure 10 is installed into the ceiling tile grid work, the telecommunications enclosure 10, along with the ceiling tiles 74, effectively preserves the barrier between the air handling space 76 above the ceiling, and the workspace 78 below the ceiling. The ceiling system fire integrity is preserved using the telecommunications enclosure. The equipment 36 is effectively moved into the workspace 78, and removed from the undesirable environment of the air handling space 76. Since the equipment 36 is substantially within the work space 78, and sealed-off from the air handling space 76, the equipment 36 need not be plenum rated, and the depth of the equipment housing 14 is minimized, simplifying installation. The equipment 36 can be accessed by authorized users from the work space 78 without penetrating the air handling space. The enclosed equipment 36 is cooled by passive air mixing though the highly perforated enclosure door 54 in the workspace 78. The equipment mounting brackets 38 position the equipment 36 largely within the depth of the enclosure door 54, permitting the air circulation created by the internal equipment fan to draw air in from one of the angled sidewalls 56 or the perforated face 58 and exhaust the air out through one of angled sidewalls 56. The number of rack mountable telecommunications or networking components which can be installed in the equipment housing 14 is only restricted by how deep a penetration into the air-handling space 76, or work space 78, or both, is permitted or desired by the design of the equipment housing 14, especially the enclosure door 54.

It is envisioned that the telecommunications enclosure 10 as described above could be installed into an opening in a wall. Whereby, the equipment housing 14 would be extend into the interior of the wall similar to the air handling space 76 and the enclosure door 54 along with the enclosed equipment 36 would extend into the work space 78. While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

We claim:

1. A telecommunications enclosure for mounting telecommunications equipment in a ceiling of a room, comprising:
    an equipment housing, said equipment housing including four sides and a top, said top having an inside surface and an outside surface and said four sides each having an inside surface and an outside surface, said inside surfaces of said four sides and said top forming a sealed box with an open end formed by said four sides;
    at least one wiring opening as part of said equipment housing to receive wiring, each of said wiring opening having a removable blank so that said wiring opening can be utilized;
    at least two brackets mounted to said inside surface of said top of said equipment housing to receive and secure the telecommunications equipment;
    an enclosure door attached to said equipment housing to close off said open end of said equipment housing, said enclosure door being removable to allow access to said equipment housing, said enclosure door having perforations covering at least 30 percent of said enclosure door to allow airflow to flow in and out of said enclosure door when in a closed position on said equipment housing; said enclosure door having a depth to said enclosure door such that a portion of said enclosure door with all of said perforations extends in the room, said depth allowing for the mounted telecommunications equipment to hang within said depth to provide more room so that said equipment housing requires less depth and to provide that the telecommunications equipment are near said perforations so that said telecommunications equipment can receive airflow flowing through said perforations.

2. The telecommunications enclosure of claim 1, wherein said enclosure door is hinged to said equipment housing.

3. The telecommunications enclosure of claim 1, wherein said enclosure door includes a lock to lock said enclosure door to said equipment housing.

4. The telecommunications enclosure of claim 1, wherein said enclosure door includes a base to contact said equipment housing, includes four side walls that includes said perforations, said side walls extending from said base to provide said depth and including a middle surface area that includes said perforations and which connects said four side walls together.

5. The telecommunications enclosure of claim 4, wherein said enclosure door is perforated in a range from 30 percent to 50 percent.

6. The telecommunications enclosure of claim 1, wherein said enclosure door is perforated in a range from 30 percent to 50 percent.

7. The telecommunications enclosure of claim 1, wherein said equipment housing includes a flange adapted to allow said equipment housing to rest in grid work of a ceiling tile system.

8. The telecommunications enclosure of claim 1, wherein said at least two brackets are adjustable with said equipment housing.

9. The telecommunications enclosure of claim 1, wherein said enclosure door includes a gas spring to restrict movement of said enclosure door.

10. The telecommunications enclosure of claim 1, wherein said equipment housing includes grid wire mounting tabs on said outside surfaces to secure equipment housing to a building ceiling system.

11. The telecommunications enclosure of claim 1, wherein each of said at least two brackets include an inverse mounting tab to accept and secure equipment in a temporary position to allow servicing of the equipment while said telecommunications enclosure is mounted in the ceiling.

12. A telecommunications enclosure for mounting telecommunications equipment in a wall of a room, comprising:
- an equipment housing, said equipment housing including four sides and a face, said face having an inside surface and an outside surface and said four sides each having an inside surface and an outside surface, said inside surfaces of said four sides and said face forming a sealed box with an open end formed by said four sides;
- at least one wiring opening as part of said equipment housing to receive wiring, each of said wiring opening having a removable blank so that said wiring opening can be utilized;
- at least two brackets mounted to said inside surface of said top of said equipment housing to receive and secure the telecommunications equipment;
- an enclosure door attached to said equipment housing to close off said open end of said equipment housing, said enclosure door being removable to allow access to said equipment housing, said enclosure door having perforations covering at least 30 percent of said enclosure door to allow airflow to flow in and out of said enclosure door when in a closed position on said equipment housing; said enclosure door having a depth to said enclosure door such that a portion of said enclosure door with all of said perforations extends in the room, said depth allowing for the mounted telecommunications equipment to hang within said depth to provide more room so that said equipment housing requires less depth and to provide that the telecommunications equipment are near said perforations so that said telecommunications equipment can receive airflow flowing through said perforations.

13. The telecommunications enclosure of claim 12, wherein said enclosure door is hinged to said equipment housing.

14. The telecommunications enclosure of claim 12, wherein said enclosure door includes a lock to lock said enclosure door to said equipment housing.

15. The telecommunications enclosure of claim 12, wherein said enclosure door includes a base to contact said equipment housing, includes four side walls that includes said perforations, said side walls extending from said base to provide said depth and including a middle surface area that includes said perforations and which connects said four side walls together.

16. The telecommunications enclosure of claim 15, wherein said enclosure door is perorated in a range from 30 percent to 50 percent.

17. The telecommunications enclosure of claim 12, wherein said enclosure door is perorated in a range from 30 percent to 50 percent.

18. The telecommunications enclosure of claim 12, wherein said equipment housing includes a flange adapted to be mounted to a wall about an opening in the wall allow said equipment housing to rest within the wall.

19. The telecommunications enclosure of claim 12, wherein said at least two brackets are adjustable with said equipment housing.

20. The telecommunications enclosure of claim 12, wherein said equipment housing includes mounting tabs on said outside surfaces to secure said equipment housing to an inside of the wall.

* * * * *